US010218236B2

(12) United States Patent
Kowalski et al.

(10) Patent No.: US 10,218,236 B2
(45) Date of Patent: Feb. 26, 2019

(54) NEUTRAL POINT OF A GENERATOR

(71) Applicant: Siemens Aktiengesellschaft, Munich (DE)

(72) Inventors: Waldemar Kowalski, Mulheim an der Ruhr (DE); Christoph Lehmann, Neukirchen-Vluyn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 643 days.

(21) Appl. No.: 14/775,922

(22) PCT Filed: Feb. 20, 2014

(86) PCT No.: PCT/EP2014/053341
§ 371 (c)(1),
(2) Date: Sep. 14, 2015

(87) PCT Pub. No.: WO2014/146855
PCT Pub. Date: Sep. 25, 2014

(65) Prior Publication Data
US 2016/0006312 A1    Jan. 7, 2016

(30) Foreign Application Priority Data
Mar. 19, 2013    (EP) .................................... 13159963

(51) Int. Cl.
H02K 3/28    (2006.01)
H02K 11/20    (2016.01)
(Continued)

(52) U.S. Cl.
CPC ................. *H02K 3/28* (2013.01); *H02K 3/12* (2013.01); *H02K 11/20* (2016.01); *H02K 11/28* (2016.01);
(Continued)

(58) Field of Classification Search
CPC .......... H02K 3/28; H02K 11/20; H02K 11/28; H02K 19/36; H02K 2213/09; H02K 5/12; H02K 5/225
See application file for complete search history.

(56) References Cited

U.S. PATENT DOCUMENTS 4,070,572 A * 1/1978 Summerhayes ....... G01R 15/00
324/96
4,428,017 A * 1/1984 Vaerewyck .......... G01R 15/246
250/225
(Continued)

FOREIGN PATENT DOCUMENTS

CN    101006632 A    7/2007
EP    1363026 A2    11/2003
(Continued)

OTHER PUBLICATIONS

CN second Office Action dated Aug. 2, 2017, for CN patent application No. 201480016544.5.
(Continued)

*Primary Examiner* — Edgardo San Martin
(74) *Attorney, Agent, or Firm* — Beusse Wolter Sanks & Maire

(57) ABSTRACT

An electrodynamic machine includes a housing and a rotor, as well as a neutral point, wherein the neutral point is located inside the housing and the neutral point ends are interconnected by means of shorting bridges, and the shorting bridges are designed such that the neutral point ends inside the generator housing are electrically isolated from each other.

11 Claims, 2 Drawing Sheets

(51) Int. Cl.
*H02K 19/36* (2006.01)
*H02K 3/12* (2006.01)
*H02K 11/28* (2016.01)
*H02K 3/00* (2006.01)
*H02K 11/00* (2016.01)
*H02K 5/12* (2006.01)

(52) U.S. Cl.
CPC .............. *H02K 19/36* (2013.01); *H02K 5/12* (2013.01); *H02K 2213/09* (2013.01)

(56) References Cited

U.S. PATENT DOCUMENTS

| | | | | |
|---|---|---|---|---|
| 4,488,072 A | * | 12/1984 | Archibald | H02K 5/225 310/71 |
| 4,689,546 A | * | 8/1987 | Stephens | G01R 15/00 310/176 |
| 4,866,316 A | * | 9/1989 | Humphries | H02K 5/225 310/52 |
| 4,968,912 A | * | 11/1990 | Shahamat | H02K 19/36 310/260 |
| 5,014,043 A | * | 5/1991 | Lopetrone | G01R 15/202 324/529 |
| 5,814,912 A | * | 9/1998 | Ross | H01R 4/48 310/71 |
| 2002/0105819 A1 | | 8/2002 | Giraud et al. | |
| 2005/0063452 A1 | * | 3/2005 | Twerdochlib | G01H 1/003 374/152 |
| 2007/0262740 A1 | | 11/2007 | Podack | |
| 2016/0006312 A1 | | 1/2016 | Kowalski et al. | |

FOREIGN PATENT DOCUMENTS

| | | | |
|---|---|---|---|
| EP | 2262082 A1 | | 6/2009 |
| EP | 2262082 A1 | | 12/2010 |
| EP | 2498384 A1 | | 9/2012 |
| JP | 2000500319 A | | 1/2000 |
| JP | 2004320955 A | * | 11/2004 ............... H02K 3/04 |
| JP | 2008306852 A | * | 12/2008 |
| SU | 425268 | | 4/1974 |
| SU | 1262640 | | 10/1986 |
| WO | 9718477 | | 5/1997 |
| WO | 9718477 A2 | | 5/1997 |
| WO | 2014146855 A1 | | 9/2014 |

OTHER PUBLICATIONS

JP Office Action dated Dec. 12, 2016, for JP patent application No. 2016-503585.
CN Office Action dated Feb. 16, 2017, for CN patent application No. 201480016544.5.
RU Search Report dated Feb. 7, 2017, for RU patent application No. 2015144675.
RU Grant Decision dated Feb. 27, 2017, for RU patent application No. 2015144675.

* cited by examiner

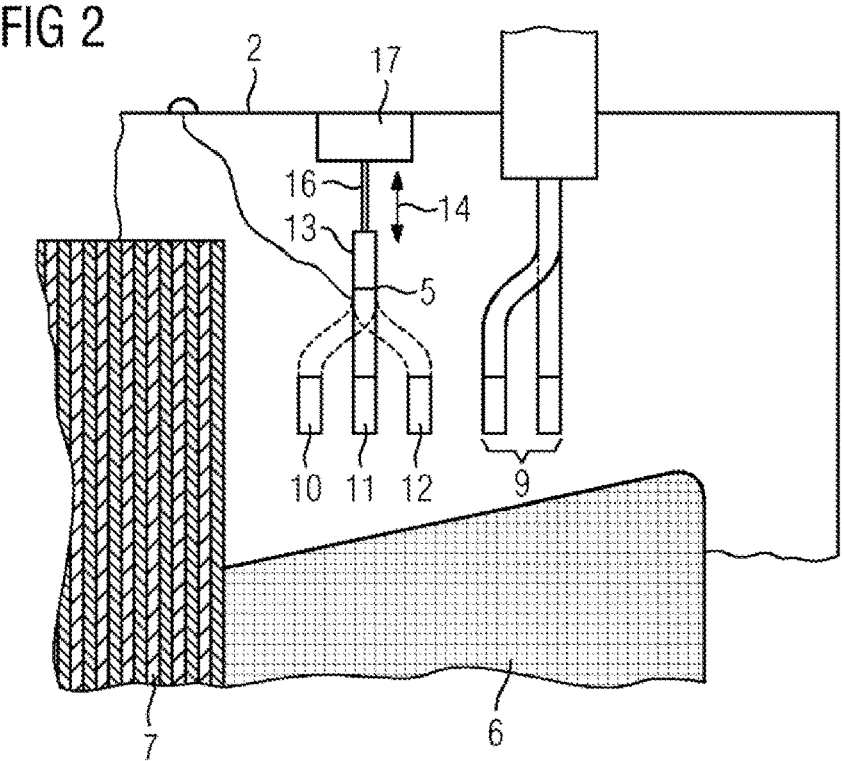
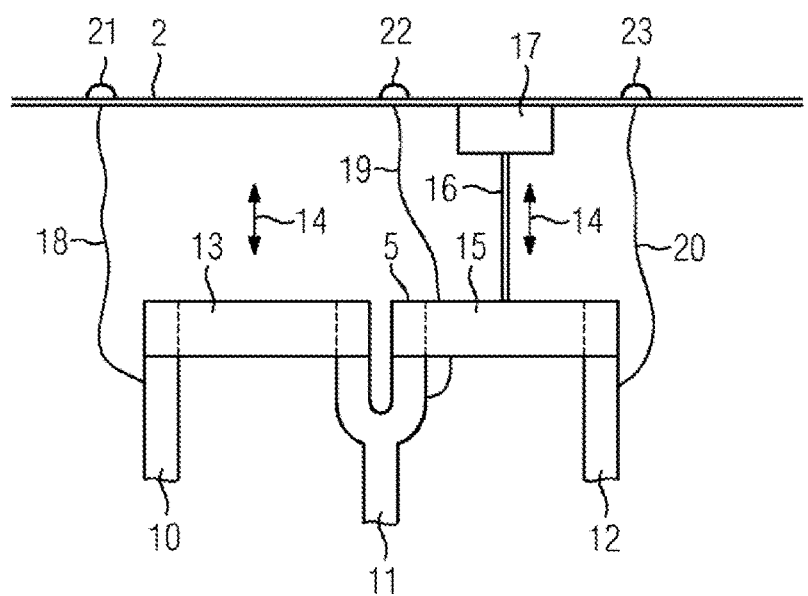

NEUTRAL POINT OF A GENERATOR

CROSS REFERENCE TO RELATED APPLICATIONS

This application is the U.S. National Stage of International Application No. PCT/EP2014/053341 filed Feb. 20, 2014, and claims the benefit thereof. The International Application claims the benefit of European Application No. EP13159963 filed Mar. 19, 2013. All of the applications are incorporated by reference herein in their entirety.

FIELD OF INVENTION

The invention relates to an electrodynamic machine, comprising a rotatably mounted rotor and a stator arranged around the rotor and a housing arranged around the stator, wherein the stator has a stator winding having three windings, wherein the windings each have a terminal lead end and a neutral point end, wherein the neutral point ends are connected to one another via a short-circuiting link to form a neutral point, wherein the neutral point is within the housing.

BACKGROUND OF INVENTION

Electrical energy is generated in electric generators as an embodiment of an electrodynamic machine. For this purpose, a rotor mounted rotatably about an axis of rotation is arranged within a stator, wherein the rotor generates a magnetic field which is moved around the axis of rotation. This rotating magnetic field induces an electric voltage in the winding arranged in the stator. Since generators experience a temperature increase during operation, they need to have suitable cooling. It is known to cool generators using air, oxygen or hydrogen. For this purpose, it is necessary to form the stator in the housing wall in such a way that the emergence of cooling medium is effectively avoided.

However, this means that the electrical energy generated in the stator needs to be passed to the outside out of the housing by means of so-called end-lead bushings, wherein the end-lead bushings should not permit any leakage with respect to the housing. The complexity involved in the production of the end-lead bushings and the arrangement thereof in the housing is comparatively great since, owing to the prevailing high voltages and currents, owing to the required short-circuit strength and owing to the requirements in respect of gas pressure and gas density, stringent electrical, thermal and mechanical requirements are set.

In general, six end-lead bushings are required for an electric generator. In such generators, there are three windings, which are also referred to as a three-phase winding and represent one phase of the three-phase AC supply. Each phase comprises a start point and an end point, wherein in each case the start point and the end point is passed out of the housing via in each case one end-lead bushing. In the case of three phases, six end-lead bushings are therefore required. For this purpose, a distinction is drawn between the start point of the winding, which is referred to as the phase terminal, and the end point of the winding, which is referred to as the neutral point terminal. It is known to connect the neutral point terminals which are passed out of the housing via the end-lead bushings to one another to form a neutral point outside the generator. The three phase terminals are coupled to a generator transformer for the transport of energy.

The insulation of the winding, in particular of the stator winding, needs to be checked regularly, which means that various electrical measurements such as, for example, resistance measurements and voltage tests, for example, need to be performed, wherein these measurements are performed offline. These measurements are taken individually for the phases. Therefore, the turn connections are passed out of the housing with the aid of so-called end-lead bushings.

The neutral point of a turbogenerator is short-circuited outside the housing and is covered by a neutral point box. The phase connections are in end-lead tubes with complex shielding and can only be made accessible with an extremely large amount of complexity in terms of dismantling. In order to be able to perform measurements on the individual phases of an electric generator, this end-lead bushing box needs to be opened and the neutral point, which includes screwed short-circuiting links, needs to be isolated and then connected again once the measurement has been performed.

The opening of the box, the isolation of the individual short-circuiting links which connect the end-lead bushings and form the neutral point, and the restoration of the contact points after the measurement operation are very complex.

SUMMARY OF INVENTION

An aim of the invention is to provide a remedy for this.

Therefore, an object of the invention is specifying an electrodynamic machine in which a test measurement can be performed more easily.

This object is achieved by an electrodynamic machine, comprising a rotatably mounted rotor and a stator arranged around the rotor and a housing arranged around the stator, wherein the stator has a stator winding having three windings, wherein the windings each have a terminal lead end and a neutral point end, wherein the neutral point ends are connected to one another via a short-circuiting link to form a neutral point, wherein the neutral point is within the housing, wherein the short-circuiting link is designed in such a way that electrical isolation can take place between the neutral point ends, wherein the electrical isolation takes place by virtue of a movement of the short-circuiting link, wherein the short-circuiting link is movable from outside the housing.

Aspects of the invention are based on the concept that first the neutral point is arranged within the housing and the isolation of the individual phases takes place by removal of the short-circuiting links within the closed housing. As a result, laborious removal of the neutral point box is no longer necessary. Likewise, time-consuming isolation of the individual phases with the short-circuiting links is no longer necessary.

This results in an enormous time saving since the end-lead bushings are dispensed with entirely.

The performance of torque controls for the screws which are required for the neutral point box is not necessary, which results in a uniform quality of the wiring of the neutral point by virtue of the use of the plug-type connection. Likewise, replacement parts such as new screwing elements are no longer required in the solution according to the invention.

A feature of the invention includes the short-circuiting link which electrically connects the neutral point ends to one another is now arranged within the housing and can also be isolated from the neutral point ends within the housing.

Advantageous developments are specified in the dependent claims.

In a first advantageous development, the neutral point ends are passed via measurement leads outwards outside the housing via measurement points.

In accordance with aspects of the invention, this advantageously takes place by virtue of the short-circuiting link being drawn in one direction. In this case, this drawing should take place in such a way that complete electrical isolation via the short-circuiting link takes place.

In an advantageous development, the opposite of electrical isolation, namely electrical connection, takes place by virtue of pressing in the direction towards the neutral point ends. In this case, the contacts should be configured in such a way that frequent connection and isolation does not result in any significant wear effects.

In a particularly advantageous manner, the movement of the short-circuiting link takes place outside the housing. This means that there is mechanical coupling between the short-circuiting link and a component with which a force can be exerted on the short-circuit link in the direction. The operation of this component is in this case performed from outside the housing.

In a further advantageous development, the movement of the short-circuiting link takes place electrically within the housing. Therefore, the short-circuiting link is intended to be connected mechanically to a further component, with which the movement of the short-circuiting link can take place electrically. In this case, a controller is arranged outside the housing, as a result of which the movement of the short-circuiting link can take place from outside the housing.

For this purpose, in an advantageous development, the short-circuiting link is connected to a substantially nonmagnetic rod assembly, and the rod assembly is connected to an apparatus for raising and lowering. Advantageously, in this case a nonmagnetic rod assembly needs to be used since magnetic forces can always occur in electrodynamic machines and would result in a disruptive force in the case of a magnetic rod assembly. In order to counteract this disruptive force, the rod assembly should be nonmagnetic.

Advantageously, the apparatus can comprise a motor, which should be dimensioned such that the force is sufficiently great to isolate the short-circuiting link from the neutral point ends.

Advantageously, the neutral point ends are laid with measuring end-lead bushings outside the housing. This is intended to result in the desired effect that, as soon as the short-circuiting links are removed, the end-lead bushings are connected to measuring lines in order to be able to measure currents in the phases. As a result, damage in the insulation can be identified.

In an advantageous manner, in this case current transformers for measuring the individual phases of a neutral point are arranged.

BRIEF DESCRIPTION OF THE DRAWINGS

Exemplary embodiments of the invention will be described below with reference to the drawing. Said drawing is intended to represent the exemplary embodiments in a manner which is not true to scale; instead the drawing, where useful for explanatory purposes, is in schematized and/or slightly distorted form. In respect of additions to the teaching shown directly in the drawing, reference is made to the relevant prior art. Specifically, in the drawing:

FIG. 2 shows a schematic sectional view of a part according to the invention of a generator;

FIG. 3 shows another perspective illustration of a part according to the invention of a generator.

DETAILED DESCRIPTION OF INVENTION

Figure 1:
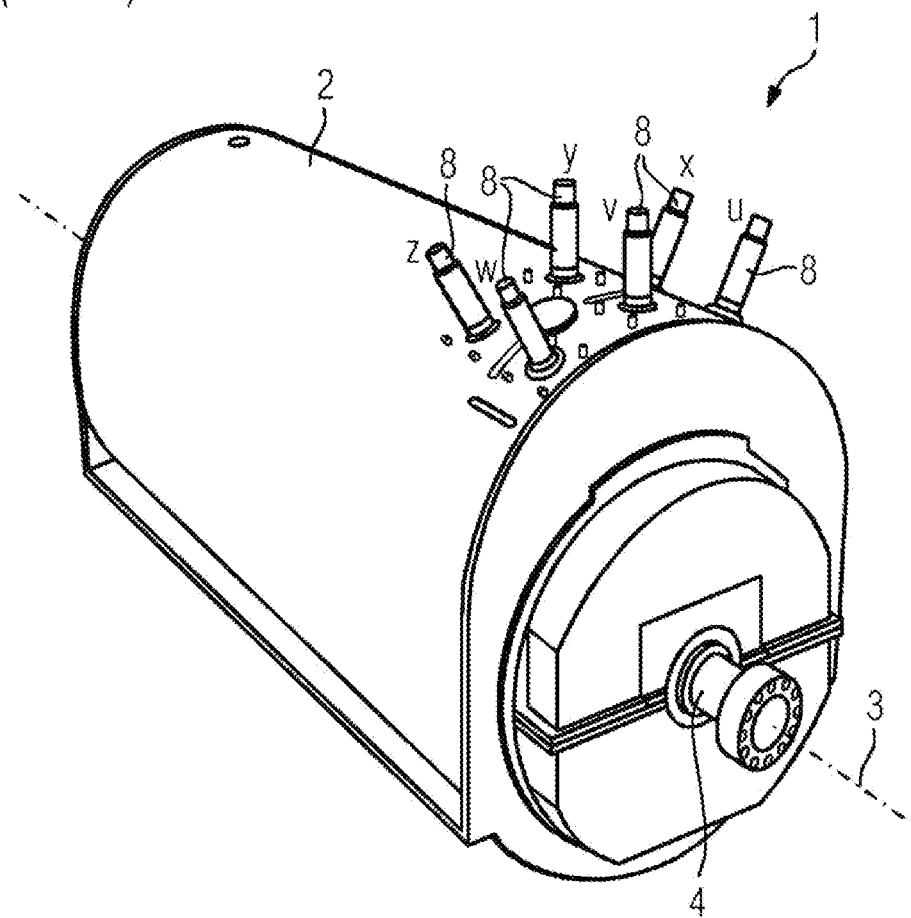
FIG. 1 shows a perspective view of a generator in accordance with the prior art.

FIG. 1 shows a perspective view of a generator 1 as an embodiment of an electrodynamic machine. Such electric generators produce electrical energy of between 10 megawatts and 1500 megawatts. An electric motor is, for example, a further embodiment of an electrodynamic machine 1.

The generator comprises a housing 2 and a rotor 4 mounted rotatably about an axis of rotation 3 in the housing 2. The rotor 4 comprises windings (not illustrated in any further detail in FIG. 1), which are denoted by the lowercase letters u, v and w. In the region of the communal energy supply, the generators are generally formed with three windings. The windings u, v and w each comprise a terminal lead end 9 and a neutral point end 5. The terminal lead ends u, v and w are passed to the outside via end-lead bushings 8. The end-lead bushings 8 are in this case arranged on the housing 2 in a gas-tight manner and with high voltage strength. The letters x, y and z are selected for the end-lead bushings 8 with respect to the neutral point ends. In accordance with the prior art, the neutral point ends x, y and z are connected electrically to one another and a neutral point box (not illustrated) is arranged over this neutral point end thus formed.

A stator end winding 6 (illustrated schematically) and a laminate stack 7 are shown in FIG. 2.

The electrodynamic machine 1 thus formed comprises a rotatably mounted rotor 4 and a stator arranged around the rotor 4. The stator has a stator winding having three windings. The windings each have a terminal lead end 9 and a first neutral point end 10, a second neutral point end 11 and a third neutral point end 12. The first neutral point end 10 is connected electrically to the second neutral point end 11 via a short-circuiting link 13. The neutral point ends 10, 11 and 12 are thus connected to one another to form a neutral point 5. This neutral point 5 is arranged within the housing 2. The short-circuiting link 13 is now designed in such a way that electrical isolation can take place between the neutral point ends 10, 11 and 12.

For this purpose, the short-circuiting link 13 is designed to be movable in one direction 14. This direction is illustrated by the double arrow in FIG. 2. The short-circuiting link 13 is in this case moved from outside the housing. The housing 2 is in this case closed.

A movement of the short-circuiting link 13 upwards results in the short-circuiting link 13 being drawn and thus in electrical isolation between the first neutral point end 10 and the second neutral point end 11.

FIG. 3 shows an illustration rotated through 90° with respect to FIG. 2. A second short-circuiting link 15 connects the second neutral point end 11 to the third neutral point end 12.

The same applies to the second short-circuiting link 15 as to the short-circuiting link 13. Drawing upwards in the direction 14 results in electrical isolation between the second neutral point end 11 and the third neutral point end 12.

An electrical connection is possible again when the short-circuiting link 13 and the second short-circuiting link 15 are moved downwards in the direction 14, with the result that there is touching contact between the first neutral point and the second neutral point with the short-circuiting link Likewise, a movement of the second short-circuiting link 15 downwards in the direction 14 should also follow when an electrical connection is intended to be reinstated.

The movement of the short-circuiting links 13 and 15 in this case takes place mechanically from outside the housing 2. It is likewise conceivable for the movement of the short-circuiting links 13, 15 to be capable of taking place electrically within the housing 2.

The short-circuiting link 13 is connected to an apparatus 17 for raising and lowering by a nonmagnetic rod assembly 16.

In order to now be able to perform measurements during servicing, measuring leads 18, 19 and 20 are passed out, which pass the neutral point ends 10, 11 and 12 electrically outwards outside the housing 2 via measurement points 21, 22 and 23.

The measuring lead 18 connects the neutral point end 10 to the measurement point 21. The measuring lead 19 connects the neutral point end 11 to the measurement point 22. The measuring lead 20 connects the neutral point end 20 to the measurement point 23.

The current transformers are therefore positioned internally. In order to be able to measure the individual phases after isolation of the neutral point ends 10, 11 and 12 by means of the short-circuiting links 13 and 15, the contact points of the individual connections of the neutral point are laid on the outside with the aid of measuring end-lead bushings. There, after galvanic isolation of the phase connections in the end-lead region of the generator, they can be used for the desired electrical measurements of the stator winding.

The invention claimed is:

1. An electrodynamic machine, comprising
   a rotatably mounted rotor and a stator arranged around the rotor and a housing arranged around the stator,
   wherein the stator has a stator winding having three windings,
   wherein the windings each have a terminal lead end and a neutral point end,
   wherein the neutral point ends are connected to one another via a short-circuiting link to form a neutral point,
   wherein the neutral point is within the housing,
   wherein the short-circuiting link is designed such that electrical isolation can take place between the neutral point ends,
   wherein the electrical isolation takes place by virtue of a movement of the short-circuiting link,
   wherein the short-circuiting link is movable from outside the housing, when the housing is closed.

2. The electrodynamic machine as claimed in claim 1, wherein the neutral point ends are passed via measurement leads outwards outside the housing via measurement points.

3. The electrodynamic machine as claimed in claim 2, wherein the electrical isolation takes place by virtue of the short-circuiting link being drawn in one direction.

4. The electrodynamic machine as claimed in claim 1, wherein an electrical connection between the neutral point ends takes place by virtue of pressing in the direction towards the neutral point ends.

5. The electrodynamic machine as claimed in one of claims 1,
   wherein the movement of the short-circuiting link takes place mechanically outside the housing.

6. The electrodynamic machine as claimed in claim 1, wherein the movement of the short-circuiting link takes place electrically within the housing.

7. The electrodynamic machine as claimed in claim 1, wherein the short-circuiting link is connected to a substantially nonmagnetic rod assembly, and the rod assembly is connected to an apparatus for raising and lowering.

8. The electrodynamic machine as claimed in claim 7, wherein the apparatus comprises a motor.

9. The electrodynamic machine as claimed in claim 1, wherein the neutral point ends are formed with measuring end-lead bushings outside the housing.

10. The electrodynamic machine as claimed in claim 9, wherein current transformers for measuring the individual phases of a neutral point are arranged.

11. The electrodynamic machine as claimed in claim 1, wherein the housing is gas-tight.

* * * * *